United States Patent [19]

Konstandt

[11] 4,241,682

[45] Dec. 30, 1980

[54] SOLUTIONS OF POLYETHYLENIMINE OR A HYDROPHILIC DERIVATIVE THEREOF AND A HYDROPHILIC ACRYLIC POLYMER AND WATERCRAFT COATED BELOW THE WATERLINE THEREWITH

[75] Inventor: Felix Konstandt, Jamaica, N.Y.

[73] Assignee: Milton K. Rubin, Mt. Vernon, N.Y.

[21] Appl. No.: 528,197

[22] Filed: Oct. 7, 1974

Related U.S. Application Data

[63] Continuation of Ser. No. 390,657, Aug. 22, 1973, abandoned, which is a continuation-in-part of Ser. No. 212,732, Dec. 27, 1971, abandoned.

[51] Int. Cl.$^2$ ............................................. B63B 1/34
[52] U.S. Cl. ................................ 114/67 R; 428/411; 428/469; 525/113; 525/186; 428/417; 428/418; 428/514; 428/528; 428/461; 428/463; 428/537; 428/539; 428/413; 428/457; 428/500; 106/15.05

[58] Field of Search ................ 117/75, 94, 37, 16 RR; 260/29.6 NR, 874; 106/15 AF; 114/67; 9/6; 428/500, 469, 417-418, 416, 262, 461, 411, 463, 457, 413; 427/388, 340, 409

[56] References Cited

U.S. PATENT DOCUMENTS

| | | | |
|---|---|---|---|
| 2,489,228 | 11/1949 | Rudd | 117/75 |
| 2,865,702 | 12/1958 | Bruner | 9/6 |
| 3,471,359 | 10/1969 | Goldstein | 117/75 |
| 3,702,778 | 11/1972 | Mueller et al. | 117/75 |
| 3,786,113 | 1/1974 | Vassileff | 260/874 X |
| 3,821,145 | 6/1974 | Walus | 117/75 X |
| 3,864,153 | 2/1975 | Enomoto | 117/75 |
| 4,082,884 | 4/1978 | DeLong | 114/67 |

*Primary Examiner*—George F. Lesmes
*Assistant Examiner*—Alexander S. Thomas

[57] ABSTRACT

Solutions of polyethylenimine or a hydrophilic derivative thereof and a hydrophilic acrylic polymer for coating watercraft below the waterline. The coating results in reduced drag by the water on the watercraft as it travels through the water. The coating also acts as a glaze coating which protects and increases the life of paint on the surfaces over which it is coated.

16 Claims, No Drawings

SOLUTIONS OF POLYETHYLENIMINE OR A HYDROPHILIC DERIVATIVE THEREOF AND A HYDROPHILIC ACRYLIC POLYMER AND WATERCRAFT COATED BELOW THE WATERLINE THEREWITH

This is a continuation of application Ser. No. 390,657 filed Aug. 22, 1973, now abandoned which, in turn, is a continuation-in-part of application Ser. No. 212,732, filed Dec. 27, 1971 now abandoned.

This invention relates to solutions of polymers particularly suitable for coating onto watercraft below the waterline and watercraft coated below the waterline therewith. The term "watercraft" is intended to include ships, boats, water skis, water sleds and the like. The invention also relates to the use of the coatings as protective glaze coatings on painted surfaces, especially on watercraft below the waterline and on other structures subjected to water exposure, such as underwater support structures for piers, docks, bridges and oil drilling rigs.

Decreased drag on and, hence, increased speed and/or decreased fuel or energy consumption of, watercraft moving through the water is obviously very desirable. Also desirable is the protection and prolongation of the life of painted surfaces subjected to water exposure.

It is an object of the invention to provide a novel polymeric solution which when coated below the waterline of a watercraft and permitted to dry provides a coating which decreases the drag of the water on the watercraft moving through the water and, hence, increases the speed ad/or decreases the fuel or energy consumption of the watercraft. It is also an object of the invention that the coating act as a glaze coating which protects and increases the life of a painted surface over which it is applied and which is particularly suitable for application over painted surfaces below the waterline of watercraft and on the painted surfaces of other structures subjected to water exposure such as underwater support structures for piers, docks, bridges and oil drilling rigs. Other objects of the invention will be apparent from the following description.

There have now been provided, according to the invention, novel polymeric solutions. Moreover, when these solutions are applied below the waterline of a watercraft and permitted to dry to form a coating thereon, the resultant coated watercraft are subjected to less drag by the water when moving therethrough and, hence, have a greater speed and/or lower fuel or energy consumption. Moreover, the life of paint below the coating, which is transparent, is extended.

More particularly, solutions of the invention are of polyethylenimine or a hydrophilic derivative thereof and a hydrophilic acrylic polymer.

Polyethylenimine is hydrophilic. The polyethylenimine employed in the present invention may have a molecular weight of 1,000 to 100,000. Hydrophilic derivatives of polyethylenimine which may be employed in the present invention are, for example, hydroxyethylated polyethylenimine which is the reaction product of polyethylenimine of molecular weight of 40,000 to 60,000 with ethylene oxide in a weight ratio of the polyethylenimine to the ethylene oxide of 1:0.1 to 1:1; propoxylated polyethylenimine which is the reaction product of polyethylenimine of molecular weight 40,000 to 60,000 with propylene oxide in a weight ratio of the polyethylenimine to the propylene oxide of 1:0.1 to 1:1.1; epichlorohydrin modified polyethylenimine, which is the reaction product of polyethylenimine of molecular weight 20,000 to 50,000 with epichlorohydrin in a weight ratio of about 1:1; and urea modified polyethylenimine, which is the reaction product of polyethylenimine of molecular weight 1,000 to 60,000 with urea in a weight ratio of about 1:1.

The acrylic polymer employed in the present invention is water insoluble but preferably one which can be temporarily water solubilized, by formation of an ammonium or amine salts, for example. Preferably, the acrylic polymer is a copolymer of at least one alkyl acrylate or methacrylate and acrylic acid. The alkyl of the alkyl acrylate of methacrylate is preferably of 1–4 carbon atoms. The proportion of acrylic acid is preferably such that the copolymer contains about 5 to about 10 percent by weight of carboxyl groups.

The copolymers may be made soluble in water by adjusting the pH to 8 or higher by using ammonium hydroxide or organic amines such as diisopropylamine; morpholine; triethylamine; triethanolamine; ethylenediamine; 2-methylpiperazine; monomylamine; dibutylamine; 2-amino,2-methyl,1,3-propanediol and the like. When a coating of the solution dries, the free carboxyl groups are again present and the copolymer is water insoluble again.

The carboxyl groups in the copolymers provide reactive sites for formaldehyde resins (such as melamine formaldehyde resins), epoxy resins and multivalent inorganic salts (such as ammonium dichromate, zinc oxide and other salts of zinc, calcium, iron or aluminum) to effect cross-linking.

The average molecular weight of the copolymers, prior to any cross-linking, may be about 5,000 to about 300,000. The average molecular weight of the cross-linked resins, which is difficult to determine, may be up to one million and greater.

Coatings of the polymeric compositions of the invention may be formed by any conventional technique, including spraying, brushing, doctor blade application, and the like. Air drying is effective though elevated temperatures which do not melt or burn the polymers alternatively may be used.

While water will generally be the preferred solvent, due to the economy, ease of handling and safety involved in using water, alternatively organic solvents may be employed. The aforementioned acrylic copolymers are soluble in, for example, t-butyl alcohol, diacetone alcohol, diethylene glycol, ethanol, isopropanol and methanol. Polyethylenimine and the aforementioned hydrophilic polyethylenimine derivatives, aside from being soluble in water, are soluble in the following organic solvents, for example: methanol, ethanol, propylene glycol, glycerine, ethylene glycol and triethylene glycol.

Conventional marine antifoulants may be incorporated in the composition, such as organotin compounds and copper and mercury oxides.

The weight ratio of polyethylenimine or polyethylenimine derivative to acrylic polymer in the formulations of the invention is preferably 2:1 to 0.7:1. The total concentration of the polyethylenimine or polyethylenimine derivative and acrylic polymer in the formulations is preferably 5 to 50% and most preferably 5 to 30% by weight. The coating solution is not, of course, applied to a submerged surface but to help assure good film formation, it is preferred that the surface to which the coating solution is applied be pre-wetted with water.

The invention will now be further illustrated by the following examples, which are not however intended to limit the scope of the invention.

EXAMPLE 1

Into a container equipped with a propeller agitator are fed the following materials with vigorous agitation:

| | Parts by weight |
|---|---|
| copolymer constituted by weight of 56 parts methyl methacrylate, 30 parts ethyl methacrylate and 14 parts acrylic acid, as a 70% by weight solution in isopropyl alcohol; m. wt. 30,000 | 54.2 |
| Aqueous ammonia, 28% by weight ammonia | 3.4 |
| Urea modified polyethylenimine (reaction product of polyethylenimine, m. wt. 1800, and urea in 1:1 weight ratio); 40% by weight solution in water | 88.2 |
| Deionized water | 254.2 |

Immediately prior to use, the resultant solution is mixed with Epon 812 (trademarked Epoxy resin) at the rate of approximately 5¾ oz. (by weight) of Epon 812 per gal. of the solution and is brushed onto the pre-wetted steel hull of a ship in drydock from the waterline downward and permitted to air dry. In operation thereafter, the ship is found to consume less fuel than therebefore.

EXAMPLE 2

Example 1 is repeated with similar results with the following:

| | Parts by weight |
|---|---|
| copolymer constituted by weight of 44 parts butyl acrylate, 40 parts methyl acrylate and 16 parts acrylic acid, as a 30% by weight solution in ammonia water; m. wt. 16,000 | 40 |
| Zinc oxide solution | 2 |
| Aqueous ammonia, 3% by weight ammonia | 90 |
| Polyethyleminine, m. wt. 30,000–40,000, 40% by weight solution in water | 200 |
| Deionized water | 300 |

The ZnO solution is prepared by dissolving 7.2 parts by weight ZnO and 12.7 parts by weight ammonium carbonate in 71.4 parts by weight water and then adding 8.7 parts by weight concentrated ammonium hydroxide.

EXAMPLE 3

Example 1 is repeated with similar results with the following:

| | Parts by weight |
|---|---|
| copolymer constituted by weight of 90 parts ethyl acrylate and 10 parts acrylic acid, as a 30% by weight solution in aqueous ammonia | 30 |
| Ammonium dichromate, 30% by weight aqueous solution | 10 |
| Aqueous ammonia, 3% by weight ammonia | 45 |
| Hydroxyethylated polyethylenimine (reaction product of polyethylenimine, m. wt. 40,000–60,000, and ethylene oxide in 1.0:0.75 weight ratio); 40% by weight solution in water | 200 |
| Deionized water | 350 |

What is claimed is:

1. A watercraft having below its water line a coating comprising a mixture of a hydrophilic acrylic polymer and hydroxyethylated polyethylenimine prepared by reacting polyethylenimine of molecular weight 40,000 to 60,000 with ethylene oxide in a weight ratio of the polyethylenimine to the ethylene oxide of 1:0.1 to 1:1.

2. A watercraft according to claim 1, in which the coating further comprises an epoxy resin, multivalent metal salt or formaldehyde resin reacted with the acrylic resin to provide cross linkage.

3. A watercraft according to claim 1, in which the acrylic polymer comprises a copolymer of at least one alkyl acrylate or methacrylate, in which the alkyl is of up to 4 carbon atoms and acrylic acid in such proportion that carboxyl groups constitute about 5 to about 10 percent by weight of the copolymer.

4. A watercraft according to claim 3, in which the copolymer is of molecular weight about 5,000 to about 300,000.

5. A watercraft having below its waterline a coating comprising a mixture of a hydrophilic acrylic polymer and propoxylated polyethylenimine prepared by reacting polyethylenimine of molecular weight 40,000 to 60,000 with propylene oxide in a weight ratio of the polyethylenimine to the propylene oxide of 1:0.1 to 1:1.1.

6. A watercraft according to claim 5, in which the coating further comprises an epoxy resin, multivalent metal salt or formaldehyde resin reacted with the acrylic resin to provide cross linkage.

7. A watercraft according to claim 5, in which the acrylic polymer comprises a copolymer of at least one alkyl acrylate or methacrylate, in which the alkyl is up to 4 carbon atoms and acrylic acid in such proporation that carboxyl groups constitute about 5 to about 10% by weight of the copolymer.

8. A watercraft according to claim 7, in which the copolymer is of molecular weight about 5,000 to about 300,000.

9. A watercraft having below its waterline a coating comprising a mixture of a hydrophilic acrylic polymer and epichlorohydrin modified polyethylenimine prepared by reacting polyethylenimine of molecular weight 20,000 to 50,000 with epichlorohydrin in a weight ratio of about 1:1.

10. A watercraft according to claim 9, in which the coating further comprises an epoxy resin, multivalent metal salt or formaldehyde resin reacted with the acrylic resin to provide cross linkage.

11. A watercraft according to claim 9, in which the acrylic polymer comprises a copolymer of at least one alkyl acrylate or methacrylate, in which the alkyl is up to 4 carbon atoms and acrylic acid in such proportion that carboxyl groups constitute about 5 to about 10% by weight of the copolymer.

12. A watercraft according to claim 11, in which the copolymer is of molecular weight about 5,000 to about 300,000.

13. A watercraft having below its waterline a coating comprising a mixture of a hydrophilic acrylic polymer and urea modified polyethylenimine prepared by reacting polyethylenimine of molecular weight 1,000 to 60,000 with urea in a weight ratio of about 1:1.

14. A watercraft according to claim 13, in which the coating further comprises an epoxy resin, multivalent metal salt or formaldehyde resin reacted with the acrylic resin to provide cross linkage.

15. A watercraft according to claim 13, in which the acrylic polymer comprises a copolymer of at least one alkyl acrylate or methacrylate, in which the alkyl is up to 4 carbon atoms and acrylic acid in such proportion that carboxyl groups constitute about 5 to about 10% by weight of the copolymer.

16. A watercraft according to claim 13, in which the copolymer is of molecular weight about 5,000 to about 300,000.

* * * * *